(12) United States Patent
Nagel

(10) Patent No.: US 11,648,997 B2
(45) Date of Patent: May 16, 2023

(54) POWERED VEHICLE

(71) Applicant: Polaris Industries Inc., Medina, MN (US)

(72) Inventor: Brett Nagel, North Branch, MN (US)

(73) Assignee: Polaris Industries Inc., Medina, MN (US)

(*) Notice: Subject to any disclaimer, the term of this patent is extended or adjusted under 35 U.S.C. 154(b) by 149 days.

(21) Appl. No.: 17/129,020

(22) Filed: Dec. 21, 2020

(65) Prior Publication Data
US 2021/0197910 A1 Jul. 1, 2021

Related U.S. Application Data

(60) Provisional application No. 62/954,218, filed on Dec. 27, 2019.

(51) Int. Cl.
| | |
|---|---|
| *B62D 24/00* | (2006.01) |
| *B62D 61/06* | (2006.01) |
| *B60K 7/00* | (2006.01) |
| *B62D 29/04* | (2006.01) |

(52) U.S. Cl.
CPC ............ *B62D 61/065* (2013.01); *B60K 7/00* (2013.01); *B62D 24/00* (2013.01); *B62D 29/04* (2013.01)

(58) Field of Classification Search
CPC ...... B62D 61/065; B62D 24/00; B62D 24/02; B60K 7/00
See application file for complete search history.

(56) References Cited

U.S. PATENT DOCUMENTS

| | | | | |
|---|---|---|---|---|
| 5,915,775 | A * | 6/1999 | Martin ................. | B62D 21/157 296/35.1 |
| 6,003,933 | A * | 12/1999 | Rinklin ................. | B62D 25/08 293/154 |
| 8,052,198 | B2 | 11/2011 | Seksaria et al. | |
| 2006/0070790 | A1* | 4/2006 | Kejha ................. | B60K 6/448 180/311 |
| 2007/0289792 | A1* | 12/2007 | Bataille ................ | B60L 50/66 180/311 |
| 2019/0016177 | A1* | 1/2019 | Mercier ............. | B60B 27/0021 |
| 2020/0346542 | A1* | 11/2020 | Rasa ................. | B62D 23/005 |

OTHER PUBLICATIONS

Canadian Office Action regarding Canadian Patent Application No. 3104095, dated Feb. 8, 2022.

* cited by examiner

*Primary Examiner* — James A English
(74) *Attorney, Agent, or Firm* — Harness, Dickey & Pierce, P.L.C.

(57) ABSTRACT

Disclosed is a vehicle assembly. The vehicle assembly may include various portions, such as body panels. The body panels may be interconnected with various support portions that may interconnect select body panel and/or frame portions.

18 Claims, 11 Drawing Sheets

POWERED VEHICLE

CROSS-REFERENCE TO RELATED APPLICATIONS

This application claims the benefit of U.S. Provisional Application No. 62/954,218, filed on Dec. 27, 2019. This application includes subject matter related to U.S. patent application Ser. No. 17/128,837 filed on Dec. 21, 2020. The entire disclosure(s) of (each of) the above application(s) is (are) incorporated herein by reference.

FIELD

The subject disclosure relates to a vehicle, in particularly to a wheeled vehicle having three or fewer wheels.

BACKGROUND

This section provides background information related to the present disclosure which is not necessarily prior art.

A vehicle can include a wheeled vehicle that is powered by a selected power plant. The power plant may include a gas powered engine, in various embodiments. The vehicle may further include a selected seating arrangement that may be open or partially enclosed. Generally, a wheeled vehicle with selected interior seating may include four or more wheels. In the four or more wheels configuration, generally either forward or rearward wheel pairs are powered. The powered wheels provide the mode of force for the vehicle to move as the wheels touch and rotate relative to a ground or a travel surface.

SUMMARY

This section provides a general summary of the disclosure, and is not a comprehensive disclosure of its full scope or all of its features.

A wheeled vehicle may include a three-wheeled vehicle including a passenger compartment. A three-wheeled vehicle may include a three-wheeled vehicle or auto-cycle such as the Slingshot® vehicle sold by Polaris Industries Inc. having a place of business in Medina, Minn. The vehicle may include less than four wheels, such as three wheels. The vehicle may further include a single rear drive wheel that is powered by an engine via a selected transmission. The drive wheel may be powered by the engine to move the vehicle based upon an input from a user or driver.

The vehicle, such as the three-wheel vehicle, may include a driver's position and a passenger position in a passenger or occupant compartment. The occupant compartment may be open above the seating positions and instrument panel of the vehicle with minimal enclosures upon the vehicle. Thus, the occupant compartment may be substantially open to exterior elements.

Further the occupant compartment may include controls for operating the vehicle such as a steering wheel to steer the vehicle, such as through a steering rack and steering shaft. The controls may further include various electronic controls for operation of various portions of the vehicle such as a navigation system, audio system, wireless communication systems (e.g. Bluetooth® radio transmission systems and/or WiFi® wireless radio transmission systems). The various electronic controls may be detected from selected external environment conditions such as rain, cold, and the like.

The passenger compartment may also be partially surrounded by one or more panels. The panels may be body panels that are connected to a selected body frame or chassis. The body panels may be connected and/or secured to the chassis frame with one or more components and volume filling portions. The connections may include a bracket that fills a selected volume and supports a panel sheet or member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
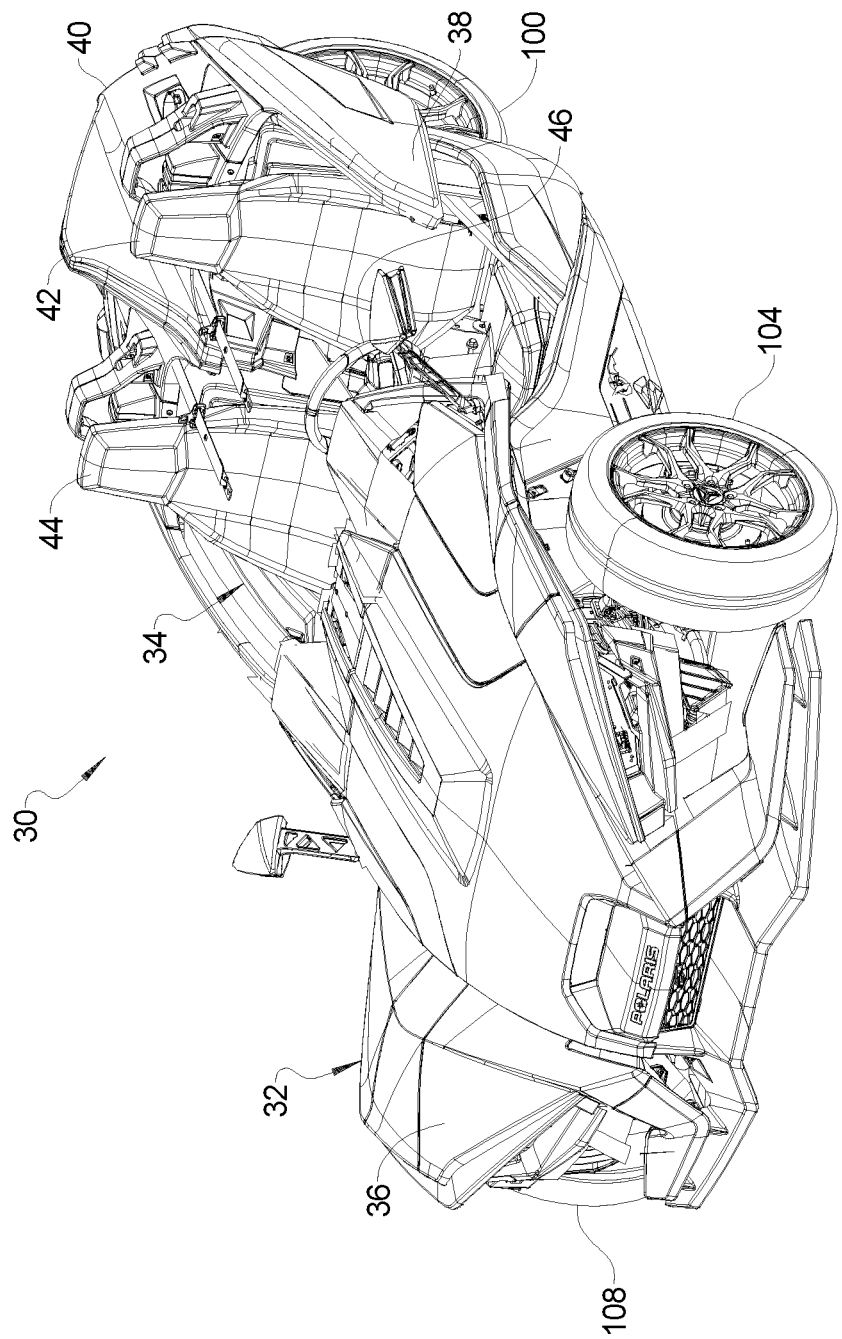
FIG. 1 is a front perspective view of a vehicle, accordingly to various embodiments.
Figure 2:
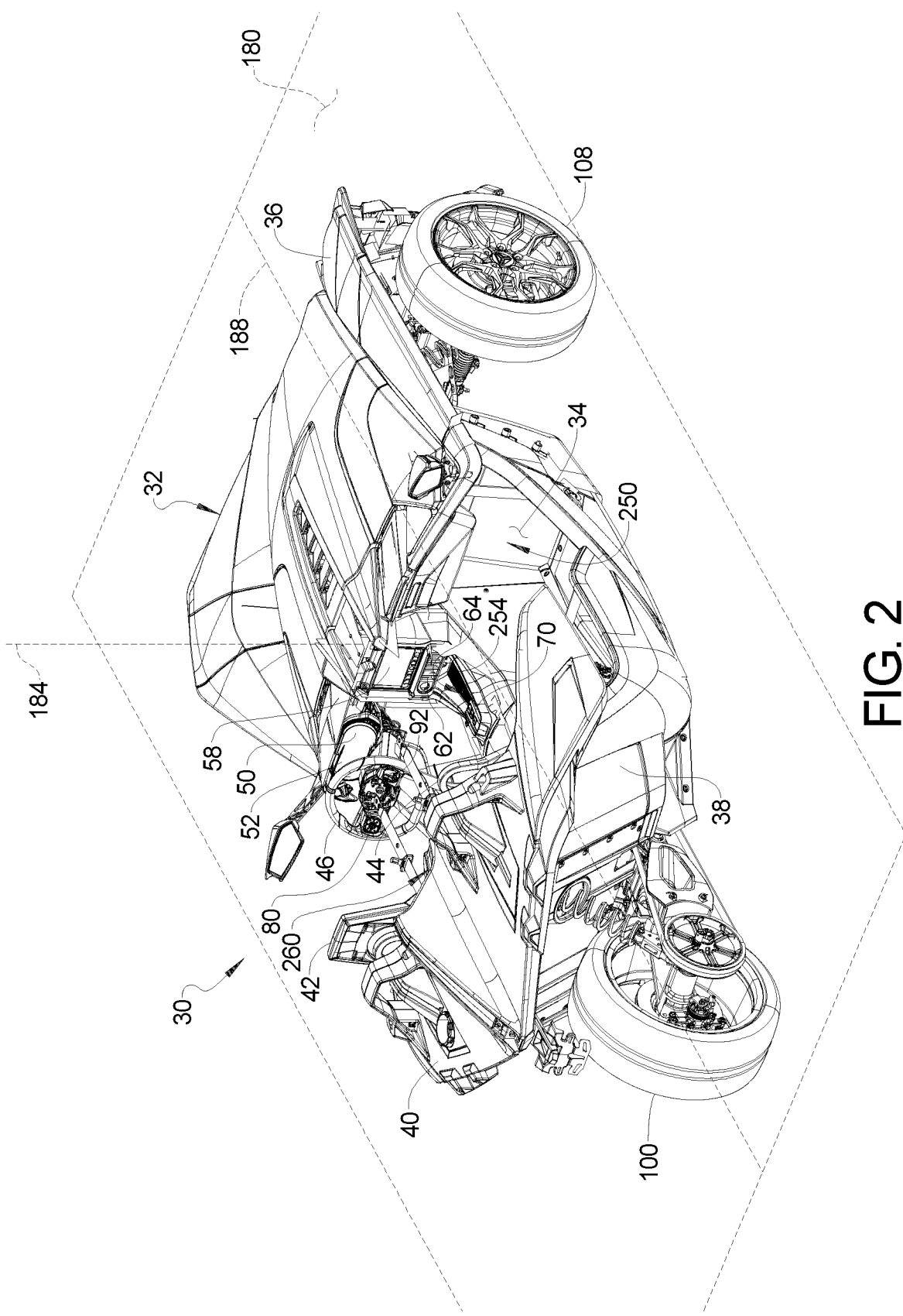
FIG. 2 is a rear top perspective view of the vehicle of FIG. 1.
Figure 3:
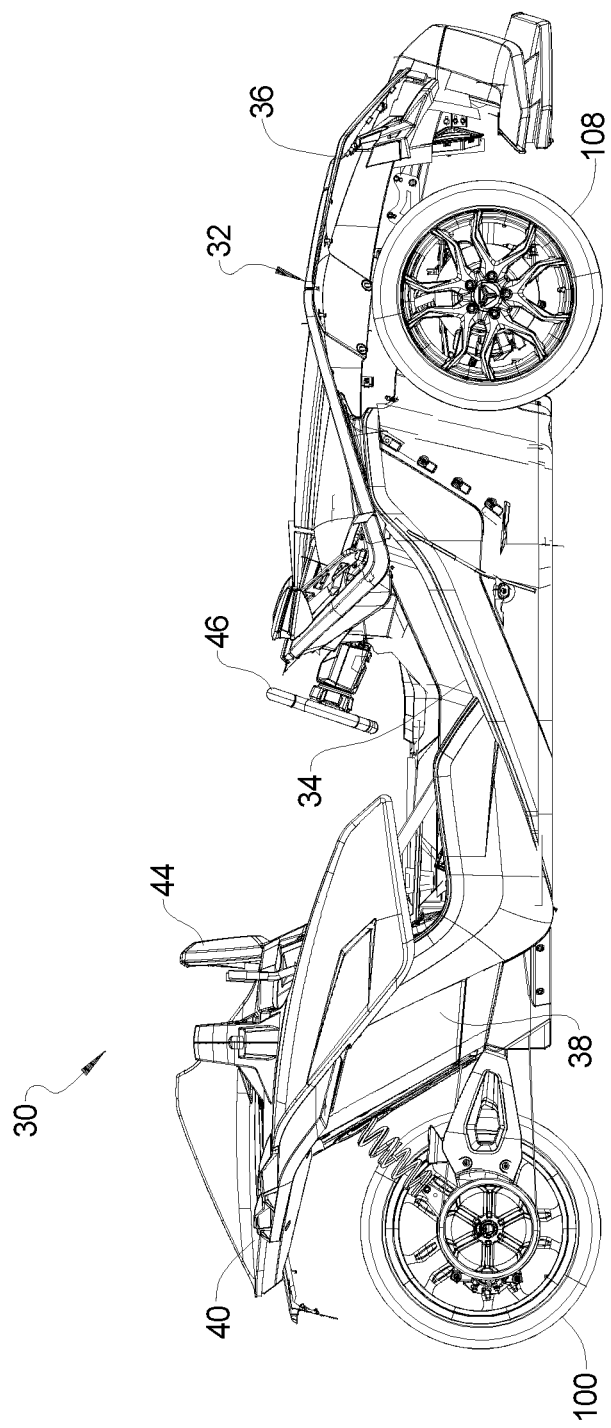
FIG. 3 is a side plan view of the vehicle of FIG. 1.
Figure 4:
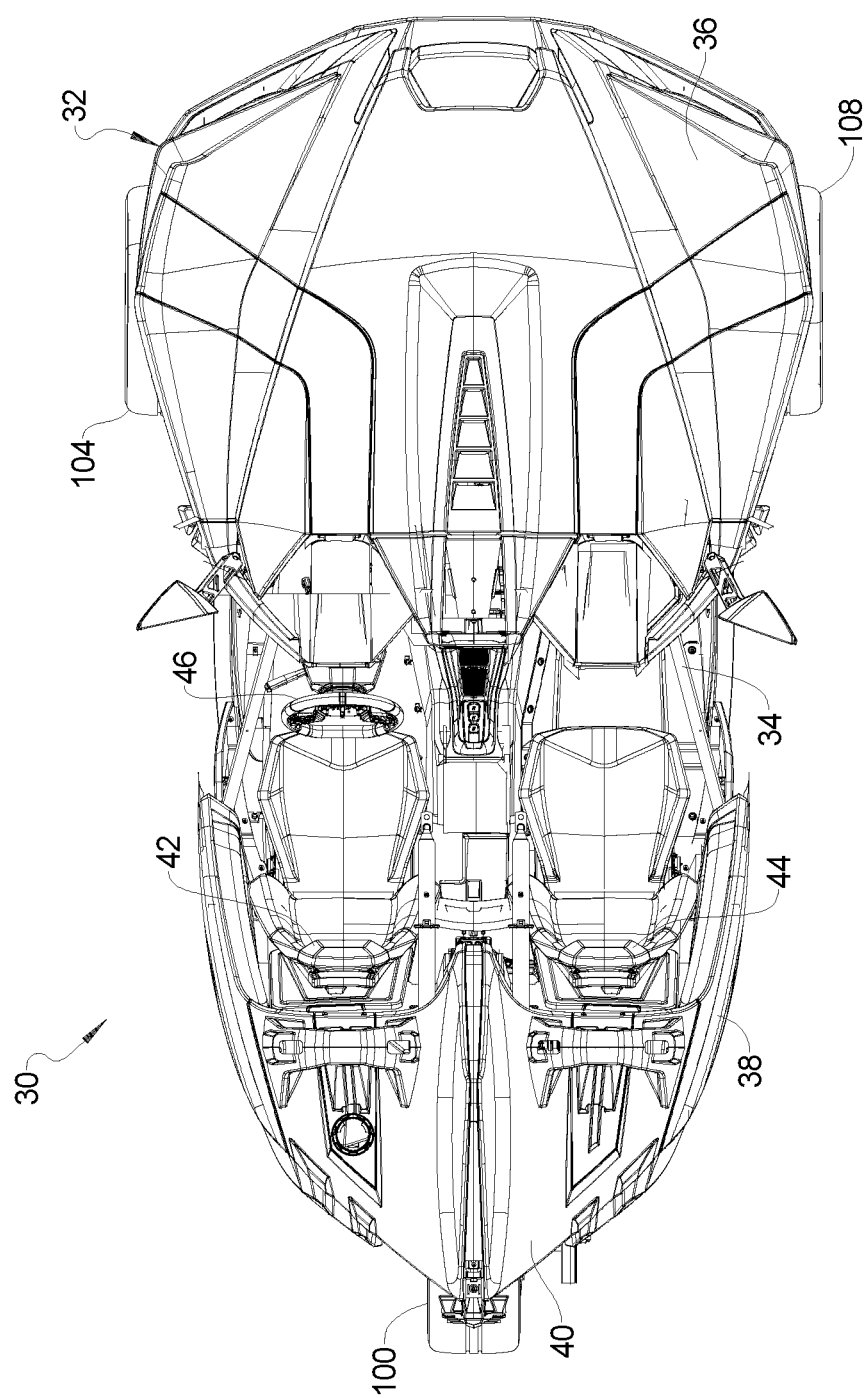
FIG. 4 is a top plan view of the vehicle of FIG. 1.
Figure 5:
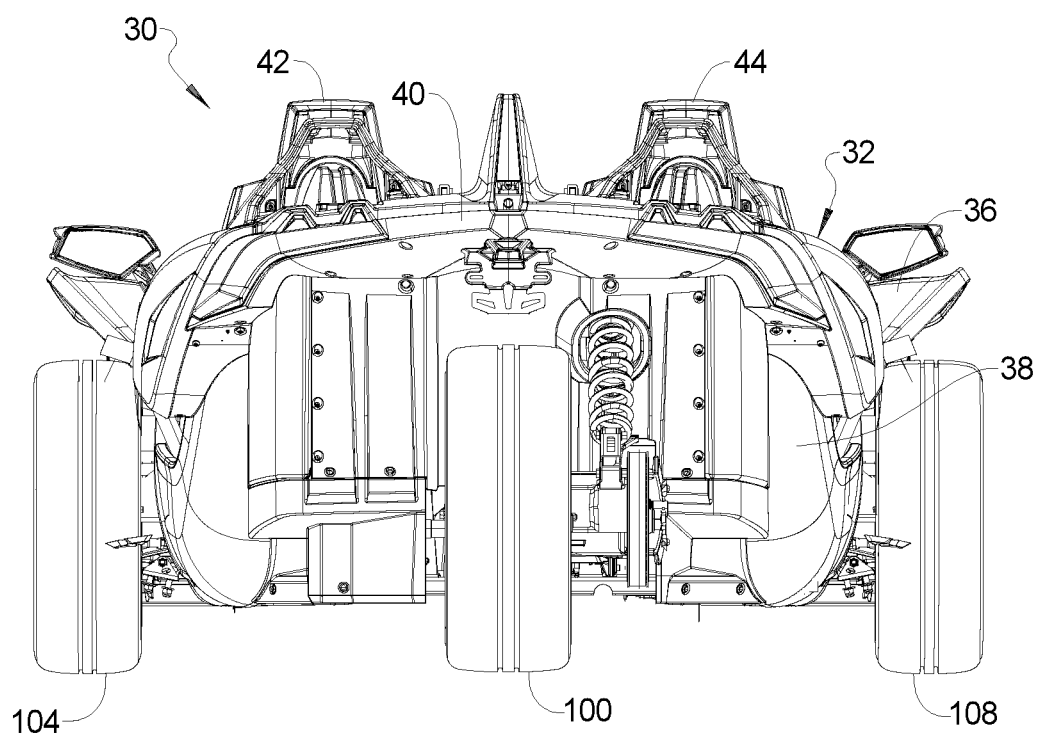
FIG. 5 is a rear elevation view of the vehicle of FIG. 1.

Example embodiments will now be described more fully with reference to the accompanying drawings.

With initial reference to FIGS. 1-5, a vehicle 30 is illustrated. The vehicle 30 may include a vehicle that includes an exterior body assembly 32 that may surround an interior or passenger compartment 34. The exterior body 32 may include portions that surround or connect with an interior frame, as discussed further herein. The body 32 may further include various features such as a fender 36 a side panel or molding 38 and a rear assembly 40.

The interior passenger compartment 34 may include various features such as one or more chairs or seat 42, 44 for receiving or holding one or more passengers. Various features may be provided such as one or more retention or comfort belts, a steering wheel 46, a steering pass-through or panel or area 50 that may include one or more instrument gages or clusters 52. Further the instrumentation may include a screen or changeable infotainment system or center 58. The screen 58 may include soft keys or a touch screen that may allow for input of various information by the user or rider. Additional or selected hard buttons or toggle switches 62 may also be provided, such as in a center console or area 64. The center console 64 may also include various additional switches or selectors such as a gear shift or drive selector 70. The drive selector 70 may be provided to allow for selection by the user of various drive gears and/or modes of the vehicle 30. Drive gears may include as a drive or forward mode or gear, a reverse mode or gear, and/or a neutral gear or position. Various gear ratios may be selected by a selector or gear shift mechanism in either the forward or drive mode or the reverse mode.

The interior 34 may also include various additional hand controls such as one or more push button assemblies 80 that may be integrated into the steering wheel 46. The push button assembly 80 may include a plurality of selector buttons, such as four corner selector buttons and a central selector button. It is understood, however, any appropriate number of selector buttons may be provided via the assembly 80 and five is merely exemplary. Further the steering wheel 46 may include more than one selector button assembly such as the selector button assembly 80 being a left or first selector button and a second selector button assembly 92 being a second assembly or a right hand assembly.

The vehicle 30 may include the body 32 mounted to a frame or chassis, as discussed further herein. The passage compartment 34 may be surrounded by the body 32 and also affixed directly or indirectly to the chassis. The vehicle 30 may include an engine, as also discussed further herein, to drive a rear wheel 100. The rear wheel 100 may be drive by the engine through a selected drive train or drive line including a transmission and selected final drive such as a chain or belt drive. In various embodiments, it is understood that the final drive may also be a shaft or rigid drive system.

The vehicle 30 may further include forward or front wheels, such as a first front wheel 104 and a second front wheel 108. The front wheels 104, 108 may be unpowered such that the rear wheel 100 is the drive or power wheel for the vehicle 30. The front wheels 104, 108 may be turned to drive or direct the vehicle 30, such as through the steering wheel 46. A selected steering assembly may interconnect to the steering wheel 46 with the front wheels 104, 108 to steer and direct the vehicle 30 during motion.

In addition, the various suspension and connection components may be provided between the respective wheels 100, 104, 108 and the chassis or frame of the vehicle 30. Thus the vehicle 30 may be a wheeled vehicle including three wheels. The three wheels of the vehicle 30 may include the single rear drive wheel 100 and two forward steering wheels 104, 108. Further the vehicle 30 may include a drive and one passenger within the body 32 and the passenger compartment or area 34.

The vehicle 30, as discussed above, may include various body portions or panels, such as the side panel 38. The side panel 38 may include a substantially mirrored or congruent portion on a passenger side of the vehicle 30, such as a side panel 120. With continued reference to FIGS. 1-5 and additionally reference to FIGS. 6 and 7, the body panels 38, 120 will be discussed in greater detail. Generally, the body panels 38, 120 may include portions that substantially similar to one another, except for being on a different side of the vehicle 30. Accordingly, the various portions of the side panels 38, 120 may be understood to be substantially identical to one another, except as discussed further herein, and referenced to only one of the side panels 38, 120 is not intended to be limiting, but is understood to be similar for the opposite side panel unless specifically identified otherwise. Further, similar portions referred to one side panel will have the same reference number for the other side panel augmented with a prime.

In various embodiments, the side panel 38 may include an exterior panel or portion 130. The exterior panel 130 may be formed as a sheet for inclusion in the body panel 38. In various embodiments, for example, the sheet 130 may formed of a selected material, such as a metal, metal alloy, polymer, etc. The sheet 130 may be formed in any appropriate manner, such as a vacuum formed sheet, a molded sheet, a stamped sheet, etc.

The exterior panel 130 may include an exterior surface (e.g. opaque) that may include a selected exterior color or livery. The body panel 38 may further include an interior portion or panel member 134. The internal portion 134 may include various comfort features, as the interior panel 134 may be positioned adjacent and/or able to contact an occupant of the vehicle 30, such as the driver of the vehicle. Accordingly, the driver in the driver seat 42 may contact the interior panel 134 during operation of the vehicle 30. Thus, the interior panel 134 may include or form various features such as comfort features, elastic features, energy absorption, or the like.

The exterior panel member 130 and the interior panel member 134, however, may be formed of similar or different materials. Generally, the exterior panel may be formed of such materials such as Thermoplastic olefin (TPO), Acrylonitrile Butadiene Styrene (ABS), High-density polyethylene (HDPE), combinations thereof or other appropriate materials. The internal panel 134 may be formed of similar materials and/or different materials.

The body panel assembly 38, however, may include the exterior panel member 130 and the interior panel member 134. The two panel members may interconnect in a selected manner, such as with one or more pins or studs 140, 144. The pins 140, 144 may be push and/or locking pins. The pins 140, 144, however, may also or alternatively be bolts, screws, rivets, and pins are merely exemplary fastening members. The pins 140, 144 may pass through passages formed in the exterior panel 130 and/or the interior panel 134.

The pins 140, 144 may also engage one or more brackets and chassis members, also referred to as frame members, such as a chassis member tube 150. The chassis tube 150 may include a passage or bracket member 152 into which the pin 140 may engage or pass. The pin 140 may engage with the bracket 142 in any appropriate manner, such as with a biasing member, engaging a clip, or other appropriate connection. Accordingly, the chassis member 150 may be engaged to the body panel 38 in a substantially fixed manner with the pins 140, 144. The pins may pass through both the interior panel 134 and the exterior panel 130 in any appropriate manner, such as with bores formed through tabs therein, or the like.

The body panels 130, 134 may include a selected material structure and property, such as elasticity, rigidity, etc. The structure of the panels, such as the exterior panel 130, may be based upon the materials, thickness, and other features of the respective panels (e.g. reinforcing members, etc.). In various embodiments, for example, the exterior panel 130 may have a thickness of the material, such as a thickness 160 with reference to FIG. 8, of about 1 millimeter (mm) to about 8 mm and further including 1 mm to about 5 mm, and further including about 3 mm thick. In various embodiments, therefore, the exterior body panel 130 may flex under a selected load, such as under a force applied by a user placing a hand on the exterior panel 130 when supported only by the chassis member 150.

Figure 6:
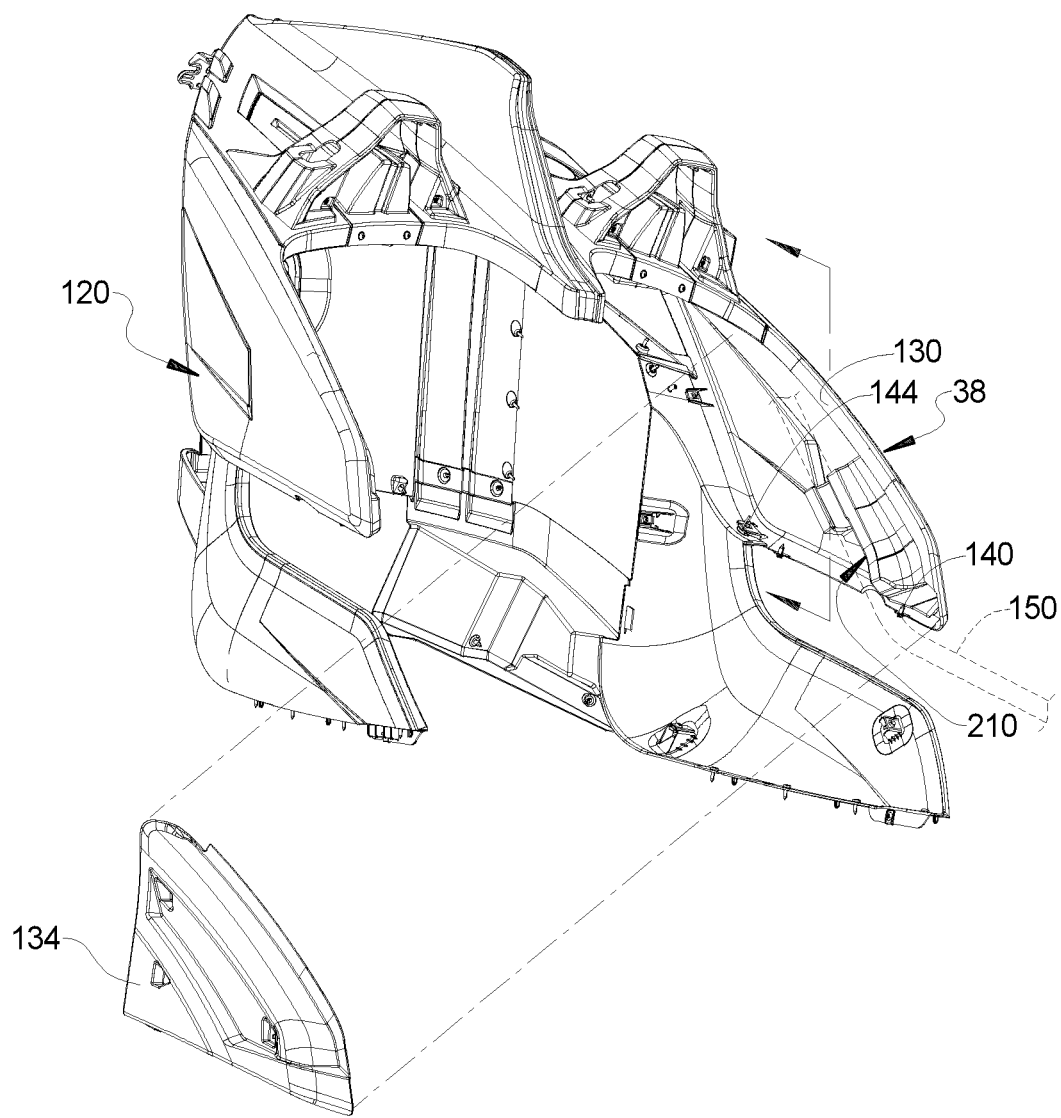
FIG. 6 is a detailed partial exploded view of the rear interior of the vehicle of FIG. 1, according to various embodiments.
Figure 7:
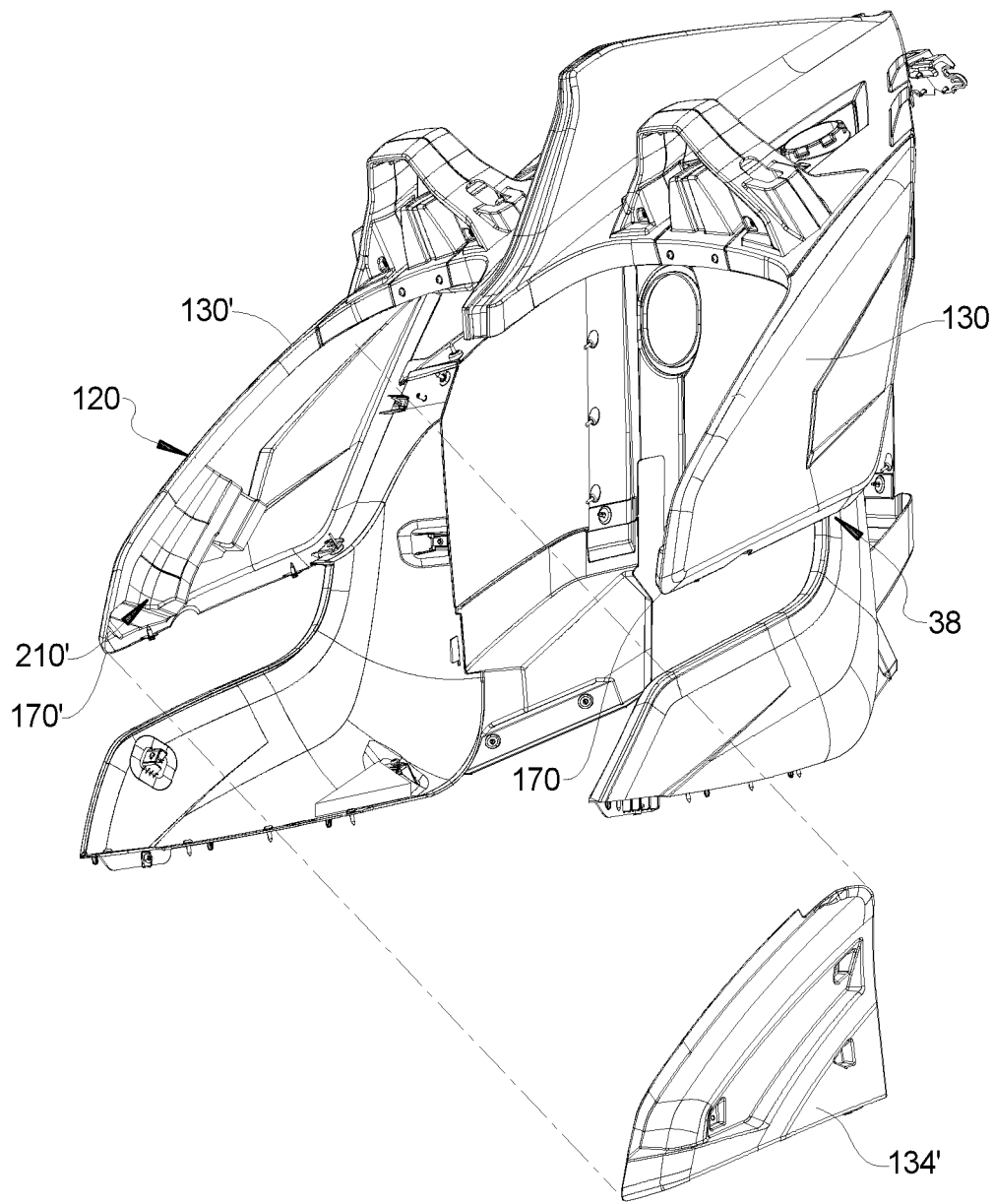
FIG. 7 is a second detailed rear perspective view of the vehicle of FIG. 1.
Figure 8:
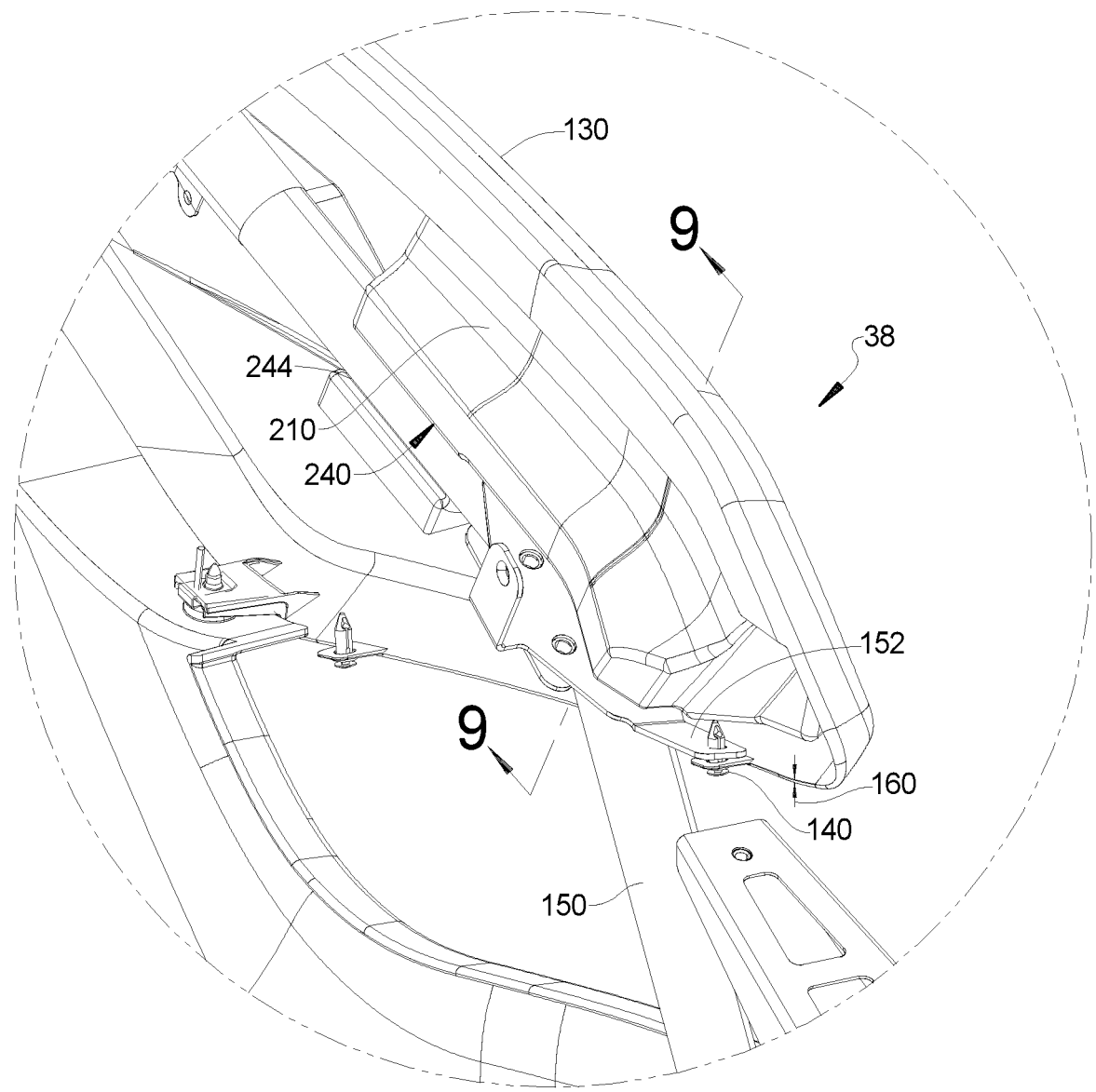
FIG. 8 is a detailed view of a portion of an interior of the vehicle of FIG. 1.
Figure 9:
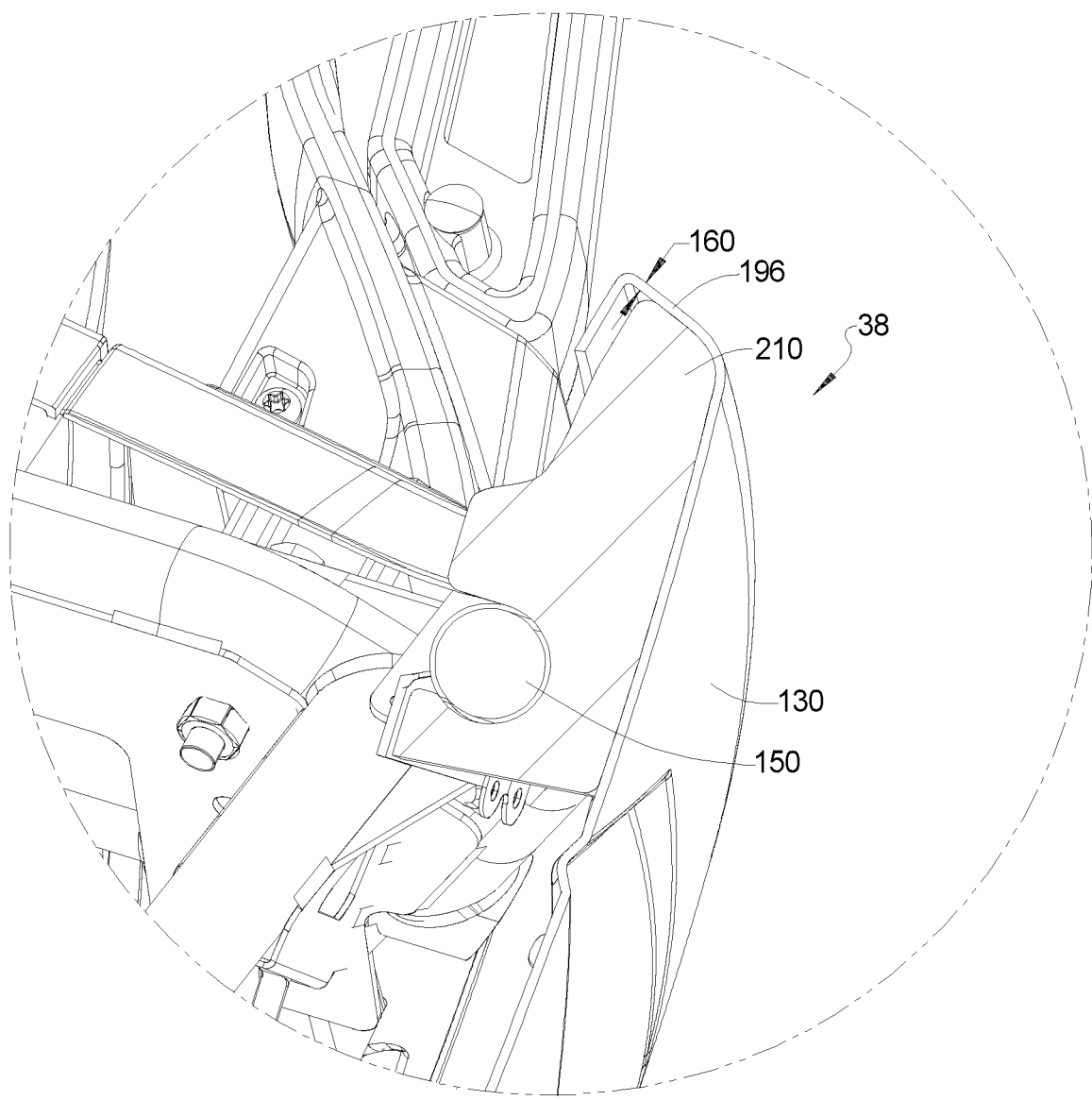
FIG. 9 is a cross-section view taken line 9-9.
Figure 10:
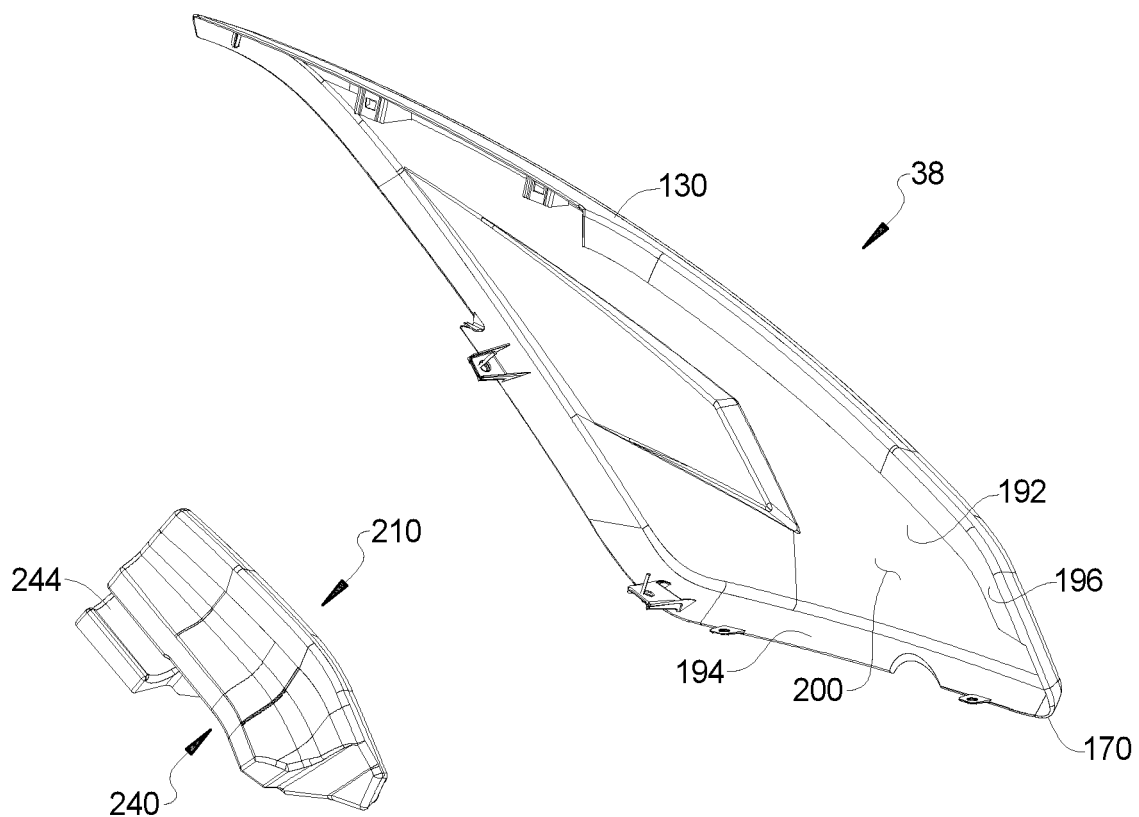
FIG. 10 is a detailed exploded view of a body panel.
Figure 11:
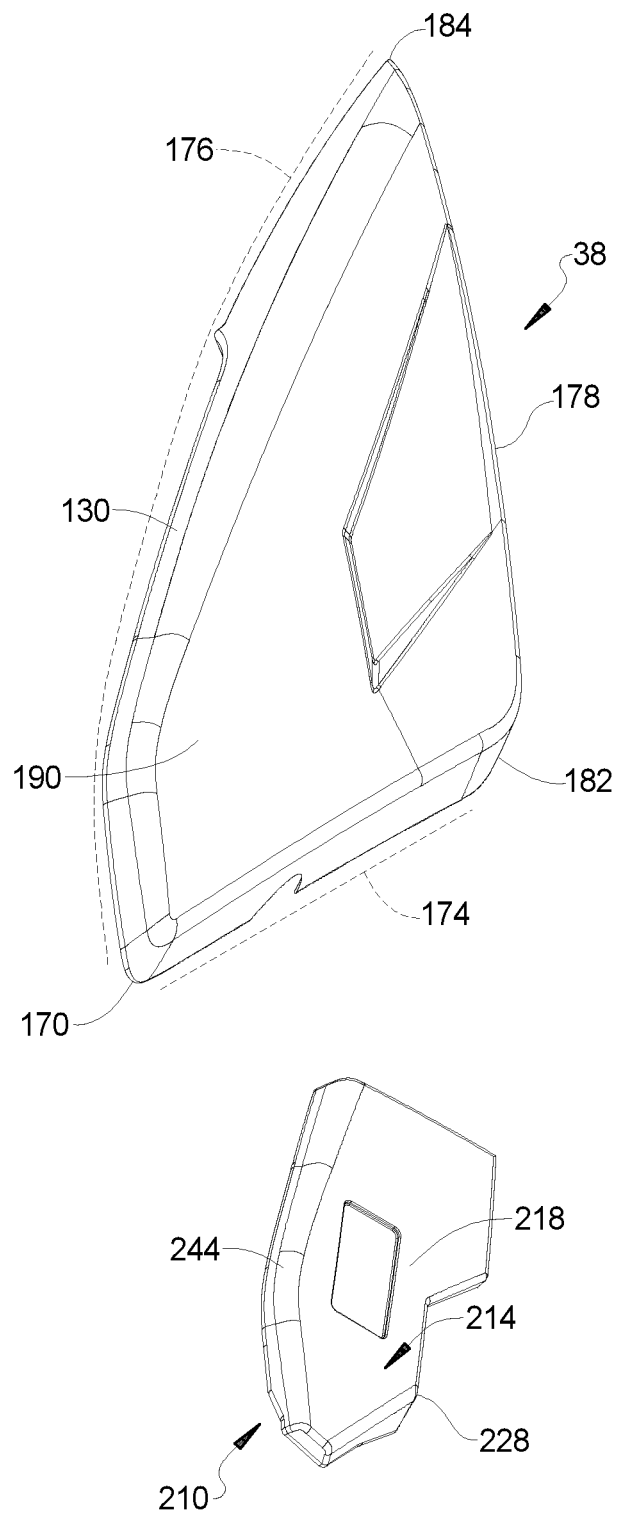
FIG. 11 is a second perspective view of the detailed body panel of FIG. 10.

With continuing reference to FIGS. 6-8 and with additional reference to FIGS. 9-11, the body panel 38 is discussed in greater detail. As discussed above, the body panel 120 may be substantially similar to the body panel 38 and, therefore, discussion of the body panel 38 may be understood to be similar or identical to the body panel 120.

Further, portions regarding the body panel 120 may be numbered with similar numbers as those used to reference the body panel 38 augmented with a prime.

The exterior body panel 130 may have a selected shape or contour, to form the body panel 38. In various embodiments, the body panel 38 may be similar in shape and configuration to a short wing, such as including a tip 170 and extending generally along an expanding taper between two edges or lines 174 and 176. The side panel 38, therefore, may also have a back or rearward portion 178 that is larger between two ends 182 and 184 than the tip 170. The body panel 130 may include various contours and other shapes that provide a selected aesthetic to the body panel 38. Nevertheless, as discussed above, the thickness 160 of the body panel 130 is between different and generally opposed surfaces such as an outer surface or member 190 and an internal surface 192. Further, the panel 130 may include one or more return walls or extending walls, such as first wall 194 and a top or end wall 196. Thus, the exterior panel 130 may form or define at least a part of a volume 200 by the internal surface 192 and their respective walls 194, 196. The volume 200 may be at least partially surrounded by the panel 130 and between the internal surface 192 and the chassis 150 and/or the internal panel 134.

In various embodiments, the volume 200 may be filled or at least partially filled by a selected bracket or support member 210. The support member 210 may also be referred to a bracket or frame or chassis engaging member. The support member 210 may, however, be interconnected with the interior panel 130 and/or the interior panel 134, and/or the chassis member 150 either directly or through a separate bracket.

In various embodiments, the support member 210 may include an external geometry or shape, such as of an external surface 214 to contact the internal surface 192 of the panel member 130 in the volume 200. The external surface 214 is formed to allow for a substantially extensive support of a selected area of the internal surface 192 of the panel. The support member, therefore, may include a shape or feature to support the member 130.

In various embodiments, the external surface 214 may be a mirror shape or negative shape of an internal portion of the member 130, such as the surface 192. Thus, the external surface 214 may mate with the internal surface 192. For example, the exterior surface 214 may include a first surface portion 218 to contact the internal surface 192 of the panel. The support member 210 may further include a second surface portion 224 to contact the wall portion 196. The support member 210 may further include a third surface 228 to contact or be positioned adjacent to the wall member surface 194 of the exterior panel 130.

The support member 210 may be positioned within the exterior panel 130 to substantially support the exterior panel 130, regardless of the thickness 160 of the exterior panel 130. Accordingly, the support member 210 may include the exterior surface 214 to substantially mate or contact with the exterior panel 130 and to substantially support the exterior panel 130. The support member 210 may further fill an entire volume of a void defined by the member 130.

The support member 210 may further include an exterior surface that may be inward facing or facing the internal panel 134. The second exterior surface region 240 may include one or more surface portions or regions to connect with various portions of the vehicle 30. For example, the support member 210 may include a surface channel or engagement portion 244 to connect with or engage with the chassis member 150. In various embodiments, as illustrated in FIG. 8 and FIG. 10, the chassis member 150 may be substantially tubular and/or have an arcuate to curved exterior surface. The chassis connecting channel 244 may also have an arcuate surface that substantially is a negative, such as a depression arcuate surface, to match or engage with the frame member 250.

The support member 210 may be fixed to the external panel member 130, the frame member 150, and/or the interior panel 134. In various embodiments, selected adhesives may be used to adhere or fixedly connect the support member 210 to one or more of the portions, such as adhering the external surface 214 to the internal surface 192. The support member 210 may be mechanically connected to various other portions, such as to the chassis frame member 150 to allow for engagement/disengagement of the exterior panel 130 from the chassis member 150.

The support member 210 may be formed of selected materials to provide support to the external panel member 130 and/or the internal panel member 134. In various embodiments, the support member 210 may be formed of an appropriate material having a selected property, such as a selected modulus of elasticity. Selected materials may include rigid foamed polymer-based or comprising materials. Exemplary expanded polymer-based materials can include expanded or foamed polypropylene, polystyrene, and polyethylene. The expanded polypropylene may be formed to have a selected density, and may be selected based on various parameters for the panel 38. In various embodiments, for example, the support member 210 may support the external portion or member 130 such that it will not flex more than a selected amount, such as less or about 0.1 mm to about 2 mm, when a load is applied. The applied load may be any appropriate load, such as that of a human having a selected mass (e.g., about 50 kilograms (kg) to about 200 kg) leaning on or engaging the external panel 38 with a hand for ingress and egress from the vehicle 30.

In various embodiments, the user may place a hand or palm on the body panel 38. Thus, the body panel 38, including the support member 210, may support or withstand a pressure up to and including about 20 kg per square centimeter (kg/cm$^2$). In various embodiments, for example, the support may allow for supporting a pressure of 1 kg/cm$^2$ to about 15 kg/cm$^2$, including about 10 kg/cm$^2$. The support member 210, therefore, may be used to support the external panel member 130 during use of the vehicle 30, such as entry and exit from the vehicle 30.

In various embodiments, the support member 210 may be fixedly connected, such as substantially permanently with chemical adhesives, welding, and the like to various portions. As discussed above, the support member 210 may be fixedly adhered or fixed to the external panel 130. The support member 210 may, however, be removably connected to various additional or other portions of the vehicle 30, such as a frame member 150. The support member 210 may also be removably connected or positioned relative the panels 130, 134. Accordingly, the support member 210 may allow for engagement and disengagement of selected portions of the vehicle 30 for various operations.

Further, the support member 210 may include various external surfaces, as discussed above, such as the external surface 214 and the external surface or region 240. The external surfaces 214, 240 may allow for a selected mating with various portions of the vehicle 30. The external surface 214 may substantially mate to fill a void or be a negative of the external panel 130 when placed next to or adjacent to the external panel 130. Further, the support member 210 may include various regions or features, such as the channel 244 to mate with, such as by receiving, various other portions such as the chassis member 150. The support member 210 may also be a negative of the internal panel 134 and/or the chassis member 150.

Accordingly, the support member 210 may provide support and/or connection of various components in the vehicle 30. The support member 210 may support the external panel member 130, in various embodiments. Further, the support member 210 may engage and allow for fixation of various portions, such as the external panel 130, to other portions of the vehicle 30, such as the chassis frame 150.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A powered vehicle, comprising:
   a chassis portion having at least one rigid member extending from a rear portion of the powered vehicle to a front portion of the powered vehicle;
   a body panel configured to be held relative to the chassis portion, wherein the body panel includes a surface;
   a support member positioned between at least the chassis portion and at least a portion of the surface of the body panel;
   a rear wheel near the rear portion of the powered vehicle;
   wherein the chassis portion and the body panel are forward of the rear wheel;
   wherein the support member includes a volume configured to contact at least the portion of the surface of the body panel.

2. The powered vehicle of claim 1, further comprising:
   at most three wheels.

3. The powered vehicle of claim 2, wherein a first single wheel is a rear wheel of the powered vehicle;
   wherein a second wheel and a third wheel are forward wheels of the powered vehicle.

4. The powered vehicle of claim 3, wherein the first single wheel is a power wheel of the powered vehicle.

5. The powered vehicle of claim 4, further comprising:
   an engine to power the power wheel.

6. The powered vehicle of claim 1, further comprising:
   a passenger compartment defined at least in part by the chassis portion;
   wherein at least the chassis portion and the body panel surround at least a portion of the passenger compartment.

7. The powered vehicle of claim 1, wherein the surface of the body panel defines a contour;
   wherein the volume of the support member defines a first exterior surface that is a mirror of at least a selected portion of the surface of the body panel;
   wherein the support member substantially contacts the entire selected portion of the surface of the body panel.

8. The powered vehicle of claim 7, wherein the support member defines a second exterior surface configured to mate with at least a portion of the chassis portion;
   wherein the support member is configured to support and to connect the body panel with the chassis portion.

9. The powered vehicle of claim 8, wherein the support member is configured to support the body panel and a force of a passenger against the body panel.

10. The powered vehicle of claim 1, wherein the support member is formed of expanded polypropylene.

11. A method of forming a body panel system for a body panel of a powered vehicle, comprising:
    positioning a support member between a chassis portion and at least a portion of a surface of a body panel;
    mounting the support member to the chassis portion forward of a rear wheel; and
    supporting the body panel relative to the chassis portion with the support member at least by filling or contacting a selected volume of the body panel adjacent to at least the portion of the surface of the body panel;
    wherein the chassis portion includes at least one rigid member.

12. The method of claim 11, further comprising:
    forming the support member to have an exterior surface portion configured to both (i) contact at least the portion of the surface of the body panel and (ii) fill a volume between at least the portion of the surface of the body panel and the chassis member.

13. The method of claim 12, wherein forming the support member to have the exterior surface portion configured to contact at least the portion of the surface of the body panel includes forming the support member as a negative to at least the portion of the surface of the body panel such that the support member supports at least the portion of the surface of the body panel over a selected expanse area.

14. The method of claim 12, further comprising:
    forming the support member to have the exterior surface portion configured to contact at least the portion of the surface of the body panel and fill an entire volume between at least the portion of the surface of the body panel and the chassis member.

15. The method of claim 11, further comprising:
    forming the support member to include a groove;
    wherein mounting the support member to the chassis includes receiving the chassis within the groove.

16. The method of claim 15, further comprising:
forming the support member of expanded polypropylene.

17. The method of claim 15, further comprising:
forming the support member to support a force of at least one kilogram per 1 square centimeter.

18. The method of claim 11, forming the chassis portion and the body panel to at least partially surround a passenger compartment of the powered vehicle.

* * * * *